(12) United States Patent
McMahon

(10) Patent No.: US 11,659,298 B2
(45) Date of Patent: *May 23, 2023

(54) SEAMLESS READOUT MODE TRANSITIONS IN IMAGE SENSORS

(71) Applicant: Apple Inc., Cupertino, CA (US)

(72) Inventor: Andrew Kenneth John McMahon, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,010

(22) Filed: May 24, 2021

(65) Prior Publication Data
US 2021/0281789 A1  Sep. 9, 2021

Related U.S. Application Data

(63) Continuation of application No. 16/226,491, filed on Dec. 19, 2018, now Pat. No. 11,019,294.

(60) Provisional application No. 62/700,113, filed on Jul. 18, 2018.

(51) Int. Cl.
*H04N 5/378* (2011.01)
*H04N 25/75* (2023.01)

(52) U.S. Cl.
CPC .................... *H04N 25/75* (2023.01)

(58) Field of Classification Search
CPC .... H04N 5/378; H04N 5/3765; H04N 5/3535; H04N 5/376; H04N 5/374; H04N 5/3742; H04N 5/345; H04N 5/353
USPC ....................................................... 348/294
See application file for complete search history.

(56) References Cited

U.S. PATENT DOCUMENTS

| | | | |
|---|---|---|---|
| 4,686,572 | A | 8/1987 | Takatsu |
| 4,686,648 | A | 8/1987 | Fossum |
| 5,105,264 | A | 4/1992 | Erhardt et al. |
| 5,329,313 | A | 7/1994 | Keith |
| 5,396,893 | A | 3/1995 | Oberg et al. |
| 5,471,515 | A | 11/1995 | Fossum et al. |
| 5,541,402 | A | 7/1996 | Ackland |
| 5,550,677 | A | 8/1996 | Schofield et al. |
| 5,781,312 | A | 7/1998 | Noda |
| 5,841,126 | A | 11/1998 | Fossum et al. |
| 5,880,459 | A | 3/1999 | Pryor et al. |
| 5,949,483 | A | 9/1999 | Fossum et al. |
| 6,008,486 | A | 12/1999 | Stam et al. |
| 6,040,568 | A | 3/2000 | Caulfield et al. |

(Continued)

FOREIGN PATENT DOCUMENTS

| | | |
|---|---|---|
| CN | 1630350 | 6/2005 |
| CN | 1774032 | 5/2006 |

(Continued)

OTHER PUBLICATIONS

U.S. Appl. No. 16/805,558, filed Feb. 28, 2020, Lee et al.

(Continued)

*Primary Examiner* — Pritham D Prabhakher
(74) *Attorney, Agent, or Firm* — Brownstein Hyatt Farber Schreck, LLP

(57) ABSTRACT

An image sensor for an electronic device can adjust a scan rate of a reset pointer of a frame relative to a scan rate of a readout pointer of a previous frame. As a result, the image sensor can transition between various readout modes without interrupting image output from the image sensor.

17 Claims, 9 Drawing Sheets

(56) References Cited

U.S. PATENT DOCUMENTS

| | | | |
|---|---|---|---|
| 6,233,013 B1 | 5/2001 | Hosier et al. |
| 6,348,929 B1 | 2/2002 | Acharya et al. |
| 6,448,550 B1 | 9/2002 | Nishimura |
| 6,528,833 B2 | 3/2003 | Lee et al. |
| 6,541,751 B1 | 4/2003 | Bidermann |
| 6,670,904 B1 | 12/2003 | Yakovlev |
| 6,713,796 B1 | 3/2004 | Fox |
| 6,714,239 B2 | 3/2004 | Guidash |
| 6,798,453 B1 | 9/2004 | Kaifu |
| 6,816,676 B2 | 11/2004 | Bianchi et al. |
| 6,905,470 B2 | 6/2005 | Lee et al. |
| 6,931,269 B2 | 8/2005 | Terry |
| 6,956,605 B1 | 10/2005 | Hashimoto |
| 6,982,759 B2 | 1/2006 | Goto |
| 7,075,049 B2 | 7/2006 | Rhodes et al. |
| 7,084,914 B2 | 8/2006 | Van Blerkom |
| 7,091,466 B2 | 8/2006 | Bock |
| 7,119,322 B2 | 10/2006 | Hong |
| 7,133,073 B1 | 11/2006 | Neter |
| 7,259,413 B2 | 8/2007 | Rhodes |
| 7,262,401 B2 | 8/2007 | Hopper et al. |
| 7,271,835 B2 | 9/2007 | Iizuka |
| 7,282,028 B2 | 10/2007 | Kim et al. |
| 7,319,218 B2 | 1/2008 | Krymski |
| 7,332,786 B2 | 2/2008 | Altice |
| 7,342,270 B2 | 3/2008 | Kuwazawa |
| 7,390,687 B2 | 6/2008 | Boettiger |
| 7,415,096 B2 | 8/2008 | Sherman |
| 7,437,013 B2 | 10/2008 | Anderson |
| 7,443,421 B2 | 10/2008 | Stavely et al. |
| 7,446,812 B2 | 11/2008 | Ando et al. |
| 7,471,315 B2 | 12/2008 | Silsby et al. |
| 7,502,054 B2 | 3/2009 | Kalapathy |
| 7,525,168 B2 | 4/2009 | Hsieh |
| 7,554,067 B2 | 6/2009 | Zarnoski et al. |
| 7,555,158 B2 | 6/2009 | Park et al. |
| 7,622,699 B2 | 11/2009 | Sakakibara et al. |
| 7,626,626 B2 | 12/2009 | Panicacci |
| 7,636,109 B2 | 12/2009 | Nakajima et al. |
| 7,671,435 B2 | 3/2010 | Ahn |
| 7,728,351 B2 | 6/2010 | Shim |
| 7,733,402 B2 | 6/2010 | Egawa et al. |
| 7,737,475 B2 | 6/2010 | Hynecek |
| 7,742,090 B2 | 6/2010 | Street |
| 7,764,312 B2 | 7/2010 | Ono et al. |
| 7,773,138 B2 | 8/2010 | Lahav et al. |
| 7,786,543 B2 | 8/2010 | Hsieh |
| 7,796,171 B2 | 9/2010 | Gardner |
| 7,817,198 B2 | 10/2010 | Kang et al. |
| 7,821,547 B2 * | 10/2010 | Suzuki | H04N 5/3532 |
| | | | 348/222.1 |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 7,982,789 B2 | 7/2011 | Watanabe et al. |
| 8,026,966 B2 | 9/2011 | Altice |
| 8,032,206 B1 | 10/2011 | Farazi et al. |
| 8,089,036 B2 | 1/2012 | Manabe et al. |
| 8,089,524 B2 | 1/2012 | Urisaka |
| 8,094,232 B2 | 1/2012 | Kusaka |
| 8,116,540 B2 | 2/2012 | Dean |
| 8,140,143 B2 | 3/2012 | Picard et al. |
| 8,153,947 B2 | 4/2012 | Barbier et al. |
| 8,159,570 B2 | 4/2012 | Negishi |
| 8,159,588 B2 | 4/2012 | Boemler |
| 8,164,669 B2 | 4/2012 | Compton et al. |
| 8,174,595 B2 | 5/2012 | Honda et al. |
| 8,184,188 B2 | 5/2012 | Yaghmai |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,330,839 B2 | 12/2012 | Compton et al. |
| 8,338,856 B2 | 12/2012 | Tai et al. |
| 8,340,407 B2 | 12/2012 | Kalman |
| 8,350,940 B2 | 1/2013 | Smith et al. |
| 8,400,546 B2 | 3/2013 | Itano et al. |
| 8,441,545 B2 | 5/2013 | Hoda et al. |
| 8,456,540 B2 | 6/2013 | Egawa |
| 8,456,559 B2 | 6/2013 | Yamashita |
| 8,462,247 B2 | 6/2013 | Kim |
| 8,508,637 B2 | 8/2013 | Han et al. |
| 8,514,308 B2 | 8/2013 | Itonaga et al. |
| 8,520,913 B2 | 8/2013 | Dean |
| 8,546,737 B2 | 10/2013 | Tian et al. |
| 8,547,388 B2 | 10/2013 | Cheng |
| 8,575,531 B2 | 11/2013 | Hynecek et al. |
| 8,581,992 B2 | 11/2013 | Hamada |
| 8,594,170 B2 | 11/2013 | Mombers et al. |
| 8,619,163 B2 | 12/2013 | Ogua |
| 8,619,170 B2 | 12/2013 | Mabuchi |
| 8,629,484 B2 | 1/2014 | Ohri et al. |
| 8,634,002 B2 | 1/2014 | Kita |
| 8,648,947 B2 | 2/2014 | Sato et al. |
| 8,723,975 B2 | 5/2014 | Solhusvik |
| 8,730,345 B2 | 5/2014 | Watanabe |
| 8,754,983 B2 | 6/2014 | Sutton |
| 8,755,854 B2 | 6/2014 | Addison et al. |
| 8,759,736 B2 | 6/2014 | Yoo |
| 8,767,104 B2 | 7/2014 | Makino et al. |
| 8,803,990 B2 | 8/2014 | Smith |
| 8,810,703 B2 | 8/2014 | Mabuchi |
| 8,817,154 B2 | 8/2014 | Manabe et al. |
| 8,860,871 B2 | 10/2014 | Aoki |
| 8,879,686 B2 | 11/2014 | Okada et al. |
| 8,902,330 B2 | 12/2014 | Theuwissen |
| 8,902,341 B2 | 12/2014 | Machida |
| 8,908,062 B2 | 12/2014 | Ito |
| 8,908,073 B2 | 12/2014 | Minagawa |
| 8,923,994 B2 | 12/2014 | Laikari et al. |
| 8,934,030 B2 | 1/2015 | Kim et al. |
| 8,936,552 B2 | 1/2015 | Kateraas et al. |
| 8,946,610 B2 | 2/2015 | Iwabuchi et al. |
| 8,981,517 B2 | 3/2015 | Oshiyama et al. |
| 8,982,237 B2 | 3/2015 | Chen |
| 8,982,260 B2 | 3/2015 | Eshraghian et al. |
| 8,988,598 B2 * | 3/2015 | Ovsiannikov | H04N 5/2354 |
| | | | 348/370 |
| 9,001,251 B2 | 4/2015 | Smith et al. |
| 9,041,837 B2 | 5/2015 | Li |
| 9,017,748 B2 | 6/2015 | Theuwissen |
| 9,054,009 B2 | 6/2015 | Oike et al. |
| 9,066,017 B2 | 6/2015 | Geiss |
| 9,066,660 B2 | 6/2015 | Watson et al. |
| 9,088,727 B2 | 7/2015 | Trumbo |
| 9,094,623 B2 | 7/2015 | Kawaguchi |
| 9,099,604 B2 | 8/2015 | Roy |
| 9,100,597 B2 | 8/2015 | Hu |
| 9,106,859 B2 | 8/2015 | Kizuna et al. |
| 9,131,171 B2 | 9/2015 | Aoki et al. |
| 9,154,750 B2 | 10/2015 | Pang |
| 9,225,948 B2 | 12/2015 | Hasegawa |
| 9,232,150 B2 | 1/2016 | Kleekajai et al. |
| 9,232,161 B2 | 1/2016 | Suh |
| 9,270,906 B2 | 2/2016 | Peng et al. |
| 9,276,031 B2 | 3/2016 | Wan |
| 9,277,144 B2 | 3/2016 | Kleekajai et al. |
| 9,287,304 B2 | 3/2016 | Park et al. |
| 9,287,423 B2 | 3/2016 | Mori et al. |
| 9,288,380 B2 | 3/2016 | Nomura |
| 9,288,404 B2 | 3/2016 | Papiashvili |
| 9,293,500 B2 | 3/2016 | Sharma et al. |
| 9,307,161 B2 * | 4/2016 | Lee | H04N 5/2355 |
| 9,319,611 B2 | 4/2016 | Fan |
| 9,344,649 B2 | 5/2016 | Bock |
| 9,380,245 B1 | 6/2016 | Guidash |
| 9,392,237 B2 | 7/2016 | Toyoda |

(56) References Cited

U.S. PATENT DOCUMENTS

| | | |
|---|---|---|
| 9,438,258 B1 | 9/2016 | Yoo |
| 9,445,018 B2 | 9/2016 | Fettig et al. |
| 9,451,887 B2 | 9/2016 | Watson et al. |
| 9,467,553 B2 | 10/2016 | Heo et al. |
| 9,473,706 B2 | 10/2016 | Malone et al. |
| 9,479,688 B2 | 10/2016 | Ishii |
| 9,490,285 B2 | 11/2016 | Itonaga |
| 9,497,397 B1 | 11/2016 | Kleekajai et al. |
| 9,503,616 B2 | 11/2016 | Taniguchi et al. |
| 9,521,337 B1 | 12/2016 | Shen |
| 9,538,067 B2 | 1/2017 | Hamada |
| 9,538,106 B2 | 1/2017 | McMahon et al. |
| 9,549,099 B2 | 1/2017 | Fan |
| 9,571,758 B2 | 2/2017 | Hashimoto et al. |
| 9,584,743 B1 | 2/2017 | Lin et al. |
| 9,584,744 B2 | 2/2017 | Lenchenkov et al. |
| 9,596,420 B2 | 3/2017 | Fan et al. |
| 9,596,423 B1 | 3/2017 | Molgaard |
| 9,609,250 B2 | 3/2017 | Lee et al. |
| 9,654,689 B2 | 5/2017 | Gleason |
| 9,661,210 B2 | 5/2017 | Haneda |
| 9,666,618 B2 | 5/2017 | Meynants |
| 9,686,485 B2 | 6/2017 | Agranov et al. |
| 9,700,240 B2 | 7/2017 | Letchner et al. |
| 9,741,754 B2 | 8/2017 | Li et al. |
| 9,749,556 B2 | 8/2017 | Fettig et al. |
| 9,754,994 B2 | 9/2017 | Koo et al. |
| 9,774,318 B2 | 9/2017 | Song |
| 9,781,368 B2 | 10/2017 | Song |
| 9,819,890 B2 | 11/2017 | Wang et al. |
| 9,857,469 B2 | 1/2018 | Oggier et al. |
| 9,888,198 B2 | 2/2018 | Mauritzson et al. |
| 9,894,304 B1 | 2/2018 | Smith |
| 9,912,883 B1 | 3/2018 | Lee |
| 9,936,105 B2 | 4/2018 | Furuya |
| 9,936,151 B2 | 4/2018 | Wang et al. |
| 9,952,323 B2 | 4/2018 | Deane |
| 9,973,678 B2 | 5/2018 | Mandelli et al. |
| 10,019,294 B2 | 7/2018 | van der Lugt et al. |
| 10,044,954 B2 | 8/2018 | Ikeda et al. |
| 10,051,217 B2* | 8/2018 | Kondo ................ H04N 25/63 |
| 10,104,318 B2* | 10/2018 | Smith ................... H04N 5/369 |
| 10,120,446 B2 | 11/2018 | Pance et al. |
| 10,136,090 B2 | 11/2018 | Vogelsang et al. |
| 10,178,329 B2* | 1/2019 | Vogelsang ........... H04N 25/134 |
| 10,212,378 B2 | 2/2019 | Negishi |
| 10,217,889 B2 | 2/2019 | Dhulla et al. |
| 10,249,660 B2 | 4/2019 | Guidash et al. |
| 10,263,032 B2 | 4/2019 | Wan |
| 10,269,857 B2 | 4/2019 | Wu et al. |
| 10,271,037 B2 | 4/2019 | Oh |
| 10,285,626 B1 | 5/2019 | Kestelli et al. |
| 10,306,167 B2 | 5/2019 | Shimasaki |
| 10,334,181 B2 | 6/2019 | Guenter et al. |
| 10,379,317 B2 | 8/2019 | Shimokawa et al. |
| 10,205,904 B2 | 9/2019 | Kobayashi |
| 10,431,608 B2 | 10/2019 | Ebihara |
| 10,440,301 B2 | 10/2019 | Li et al. |
| 10,447,950 B2 | 10/2019 | Wang |
| 10,484,627 B2 | 11/2019 | Zhou |
| 10,609,348 B2 | 3/2020 | Agranov et al. |
| 10,630,920 B2 | 4/2020 | Matsunaga |
| 10,630,929 B2 | 4/2020 | Koizumi et al. |
| 10,748,955 B2 | 8/2020 | Oh et al. |
| 10,775,605 B2 | 9/2020 | Ollila |
| 10,848,693 B2 | 11/2020 | Agranov et al. |
| 10,943,935 B2 | 3/2021 | Li et al. |
| 10,943,940 B2 | 3/2021 | Wu et al. |
| 10,951,838 B2* | 3/2021 | Eyama .................... H04N 9/07 |
| 11,252,381 B2 | 2/2022 | Pang et al. |
| 11,258,993 B2 | 2/2022 | Hoshino |
| 11,546,532 B1 | 1/2023 | Bahukhandi et al. |
| 2003/0036685 A1 | 2/2003 | Goodman et al. |
| 2004/0207836 A1 | 10/2004 | Chhibber et al. |
| 2005/0026332 A1 | 2/2005 | Fratti et al. |
| 2006/0274161 A1 | 12/2006 | Ing et al. |
| 2007/0263099 A1 | 11/2007 | Motta et al. |
| 2008/0049132 A1* | 2/2008 | Suzuki ................. H04N 5/3532 348/E5.085 |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0146234 A1 | 6/2009 | Luo et al. |
| 2009/0201400 A1 | 8/2009 | Zhang et al. |
| 2009/0219266 A1 | 9/2009 | Lim et al. |
| 2010/0134631 A1 | 6/2010 | Voth |
| 2011/0080500 A1 | 4/2011 | Wang et al. |
| 2011/0109776 A1 | 5/2011 | Kawai |
| 2011/0156197 A1 | 6/2011 | Tivarus et al. |
| 2011/0164162 A1 | 7/2011 | Kato |
| 2012/0092541 A1 | 4/2012 | Tuulos et al. |
| 2012/0098964 A1* | 4/2012 | Oggier ................ H04N 13/204 348/140 |
| 2013/0147981 A1 | 6/2013 | Wu |
| 2014/0071321 A1 | 3/2014 | Seyama |
| 2014/0078356 A1 | 3/2014 | Vaartstra |
| 2014/0078381 A1* | 3/2014 | Ovsiannikov ........ H04N 5/2354 348/370 |
| 2015/0062391 A1 | 3/2015 | Murata |
| 2015/0350583 A1* | 12/2015 | Mauritzson ....... H01L 27/14621 257/432 |
| 2016/0050379 A1 | 2/2016 | Jiang et al. |
| 2016/0191826 A1* | 6/2016 | Furuya ............... H04N 5/36961 348/246 |
| 2016/0205311 A1* | 7/2016 | Mandelli .......... H04N 5/232122 348/349 |
| 2016/0219232 A1 | 7/2016 | Murata |
| 2016/0255262 A1* | 9/2016 | Lee ..................... H04N 5/3535 348/222.1 |
| 2016/0286108 A1* | 9/2016 | Fettig ................. H04N 9/04557 |
| 2016/0309140 A1* | 10/2016 | Wang .................. H04N 17/002 |
| 2016/0323524 A1* | 11/2016 | Smith ................. H04N 5/2355 |
| 2016/0344920 A1 | 11/2016 | Iwahara |
| 2016/0344958 A1* | 11/2016 | Kondo ................ H04N 23/672 |
| 2017/0047363 A1 | 2/2017 | Choi et al. |
| 2017/0111600 A1* | 4/2017 | Wang .................... H04N 5/369 |
| 2017/0195596 A1* | 7/2017 | Vogelsang ........... H04N 25/778 |
| 2017/0295326 A1* | 10/2017 | Eyama ................ H04N 5/2352 |
| 2021/0021778 A1 | 1/2021 | Bairo |
| 2021/0281789 A1 | 9/2021 | McMahon |
| 2022/0046196 A1 | 2/2022 | Li |
| 2022/0375986 A1 | 11/2022 | Rosenblum et al. |

FOREIGN PATENT DOCUMENTS

| | | |
|---|---|---|
| CN | 1833429 | 9/2006 |
| CN | 1842138 | 10/2006 |
| CN | 1947414 | 4/2007 |
| CN | 101189885 | 5/2008 |
| CN | 101221965 | 7/2008 |
| CN | 101233763 | 7/2008 |
| CN | 101472059 | 7/2009 |
| CN | 101567977 | 10/2009 |
| CN | 101622859 | 1/2010 |
| CN | 101739955 | 6/2010 |
| CN | 101754029 | 6/2010 |
| CN | 101803925 | 8/2010 |
| CN | 102036020 | 4/2011 |
| CN | 102067584 | 5/2011 |
| CN | 102208423 | 10/2011 |
| CN | 102451160 | 5/2012 |
| CN | 102668542 | 9/2012 |
| CN | 102820309 | 12/2012 |
| CN | 102821255 | 12/2012 |
| CN | 103024297 | 4/2013 |
| CN | 103051843 | 4/2013 |
| CN | 103329513 | 9/2013 |
| CN | 103546702 | 1/2014 |
| CN | 104041009 | 9/2014 |
| CN | 104052919 | 9/2014 |
| CN | 204761615 | 11/2015 |
| CN | 205211754 | 5/2016 |

(56) References Cited

FOREIGN PATENT DOCUMENTS

| | | |
|---|---|---|
| EP | 814606 | 2/2002 |
| EP | 1763228 | 3/2007 |
| EP | 2023611 | 2/2009 |
| EP | 2107610 | 10/2009 |
| EP | 2230690 | 9/2010 |
| EP | 2512126 | 10/2012 |
| GB | 2601833 | 6/2022 |
| JP | S61123287 | 6/1986 |
| JP | 2000059697 | 2/2000 |
| JP | 2001211455 | 8/2001 |
| JP | 2001358994 | 12/2001 |
| JP | 2004111590 | 4/2004 |
| JP | 2005318504 | 11/2005 |
| JP | 2006287361 | 10/2006 |
| JP | 2007504670 | 3/2007 |
| JP | 2007516654 | 6/2007 |
| JP | 2008507908 | 3/2008 |
| JP | 2008271280 | 11/2008 |
| JP | 2008543061 | 11/2008 |
| JP | 2009021809 | 1/2009 |
| JP | 4255223 | 4/2009 |
| JP | 2009159186 | 7/2009 |
| JP | 2009212909 | 9/2009 |
| JP | 2009296465 | 12/2009 |
| JP | 2010080604 | 4/2010 |
| JP | 2010114834 | 5/2010 |
| JP | 2011040926 | 2/2011 |
| JP | 2011049697 | 3/2011 |
| JP | 2011091775 | 5/2011 |
| JP | 2011216970 | 10/2011 |
| JP | 2011217315 | 10/2011 |
| JP | 2011097646 | 12/2011 |
| JP | 2012010306 | 1/2012 |
| JP | 2012019516 | 1/2012 |
| JP | 2012513160 | 6/2012 |
| JP | 2013005397 | 1/2013 |
| JP | 2013051523 | 3/2013 |
| JP | 2013070240 | 4/2013 |
| JP | 2013529035 | 7/2013 |
| KR | 20030034424 | 5/2003 |
| KR | 20030061157 | 7/2003 |
| KR | 20050103732 | 11/2005 |
| KR | 2008/0069851 | 7/2008 |
| KR | 20100008239 | 1/2010 |
| KR | 20100065084 | 6/2010 |
| KR | 20130074459 | 7/2013 |
| TW | 200520551 | 6/2005 |
| TW | 200803481 | 1/2008 |
| TW | 201110689 | 3/2011 |
| TW | 201301881 | 1/2013 |
| WO | WO 05/041304 | 5/2005 |
| WO | WO 06/014641 | 2/2006 |
| WO | WO 06/130443 | 12/2006 |
| WO | WO 07/049900 | 5/2007 |
| WO | WO 10/120945 | 10/2010 |
| WO | WO 12/053363 | 4/2012 |
| WO | WO 12/088338 | 6/2012 |
| WO | WO 12/122572 | 9/2012 |
| WO | WO 12/138687 | 10/2012 |
| WO | WO 13/008425 | 1/2013 |
| WO | WO 13/179018 | 12/2013 |
| WO | WO 13/179020 | 12/2013 |
| WO | WO 19/102887 | 5/2019 |
| WO | WO 20/228392 | 11/2020 |

OTHER PUBLICATIONS

U.S. Appl. No. 17/075,547, filed Oct. 20, 2020, Agranov et al.
U.S. Appl. No. 17/380,852, filed Jul. 20, 2021, Li et al.
Aoki, et al., "Rolling-Shutter Distortion-Free 3D Stacked Image Sensor with -160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp-&arnumber=6487824.
Elgendi, "On the Analysis of Fingertip Photoplethysmogram Signals," *Current Cardiology Reviews,* 2012, vol. 8, pp. 14-25.
Feng, et al., "On the Stoney Formula for a Thin Film/Substrate System with Nonuniform Substrate Thickness," *Journal of Applied Mechanics,* Transactions of the ASME, vol. 74, Nov. 2007, pp. 1276-1281.
Fu, et al., "Heart Rate Extraction from Photoplethysmogram Waveform Using Wavelet Multui-resolution Analysis," *Journal of Medical and Biological Engineering,* 2008, vol. 28, No. 4, pp. 229-232.
Han, et al., "Artifacts in wearable photoplethysmographs during daily life motions and their reduction with least mean square based active noise cancellation method," *Computers in Biology and Medicine,* 2012, vol. 42, pp. 387-393.
Lopez-Silva, et al., "Heuristic Algorithm for Photoplethysmographic Heart Rate Tracking During Maximal Exercise Test," *Journal of Medical and Biological Engineering,* 2011, vol. 12, No. 3, pp. 181-188.
Santos, et al., "Accelerometer-assisted PPG Measurement During Physical Exercise Using the LAVIMO Sensor System," *Acta Polytechnica,* 2012, vol. 52, No. 5, pp. 80-85.
Sarkar, et al., "Fingertip Pulse Wave (PPG signal) Analysis and Heart Rate Detection," *International Journal of Emerging Technology and Advanced Engineering,* 2012, vol. 2, No. 9, pp. 404-407.
Schwarzer, et al., On the determination of film stress from substrate bending: STONEY'S formula and its limits, Jan. 2006, 19 pages.
Shen et al., "Stresses, Curvatures, and Shape Changes Arising from Patterned Lines on Silicon Wafers," Journal of Applied Physics, vol. 80, No. 3, Aug. 1996, pp. 1388-1398.
Yan, et al., "Reduction of motion artifact in pulse oximetry by smoothed pseudo Wigner-Ville distribution," *Journal of NeuroEngineering and Rehabilitation,* 2005, vol. 2, No. 3, pp. 1-9.
Yousefi, et al., "Adaptive Cancellation of Motion Artifact in Wearable Biosensors," 34th Annual International Conference of the IEEE EMBS, San Diego, California, Aug./Sep. 2012, pp. 2004-2008.
Fontaine, "The State-of-the-Art of Smartphone Imagers," 2019 International Image Sensor Workshop, Snowbird, Utah, Jun. 23-27, 2019, 3 pages.
Jang et al., "A new PDAF correction method of CMOS image sensor with Nonacell and Super PD to improve image quality in binning mode," IS&T International Symposium on Electronic Imaging 2021, Image Quality and System Performance XVIII, 5 pages.

\* cited by examiner

SEAMLESS READOUT MODE TRANSITIONS IN IMAGE SENSORS

CROSS-REFERENCE TO RELATED APPLICATIONS

This application is a continuation of U.S. patent application Ser. No. 16/226,491, filed Dec. 19, 2018, which claims the benefit under 35 U.S.C. § 119(e) of U.S. Provisional Patent Application No. 62/700,113, filed on Jul. 18, 2018, the contents of which are incorporated herein by reference as if fully disclosed herein.

FIELD

Embodiments described herein relate to image sensors and, in particular, to image sensors configured to seamlessly transition between readout modes.

BACKGROUND

An image sensor for an electronic device typically includes an array of photosensitive electronic components conventionally referred to as "photosites." When exposed to light, each photosite accumulates an electric charge proportional to the brightness of light illuminating that photosite for the duration of the exposure. After exposure, the image sensor reads out the accumulated electric charge of all or some of the photosites to generate an image. The photosites of a conventional image sensor are generally read out in sequence (e.g., by rows or by columns) for each image output from the image sensor.

Some image sensors support multiple photosite readout modes. Example readout modes include full-resolution readout modes, binning readout modes, oversampling readout modes, and so on. However, conventional image sensors undesirably interrupt—and/or otherwise disable—image output while transitioning between readout modes.

SUMMARY

Many embodiments described herein reference a method of operating an image sensor. The method includes the operations of: applying a readout signal to a first group of photosites defined by a readout pointer; applying a reset signal to a second group of photosites defined by a reset pointer; incrementing the readout pointer at a first scan rate; and incrementing the reset pointer at a second scan rate different from the first scan rate. In these examples, the reset signal and the readout signal are applied to the first and second group of photosites, respectively, in phase.

Some embodiments described reference an image sensor including a photosite array. The photosite array includes a first group of photo sites and a second group of photosites. The image sensor also includes a controller configured to: apply a readout signal (associated with a readout pointer) to the first group of photosites; apply a reset signal (associated with a reset pointer) in phase with the readout signal, to the second group of photosites; increment the readout pointer at a first scan rate; and increment the reset pointer at a second scan rate different from the first scan rate.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
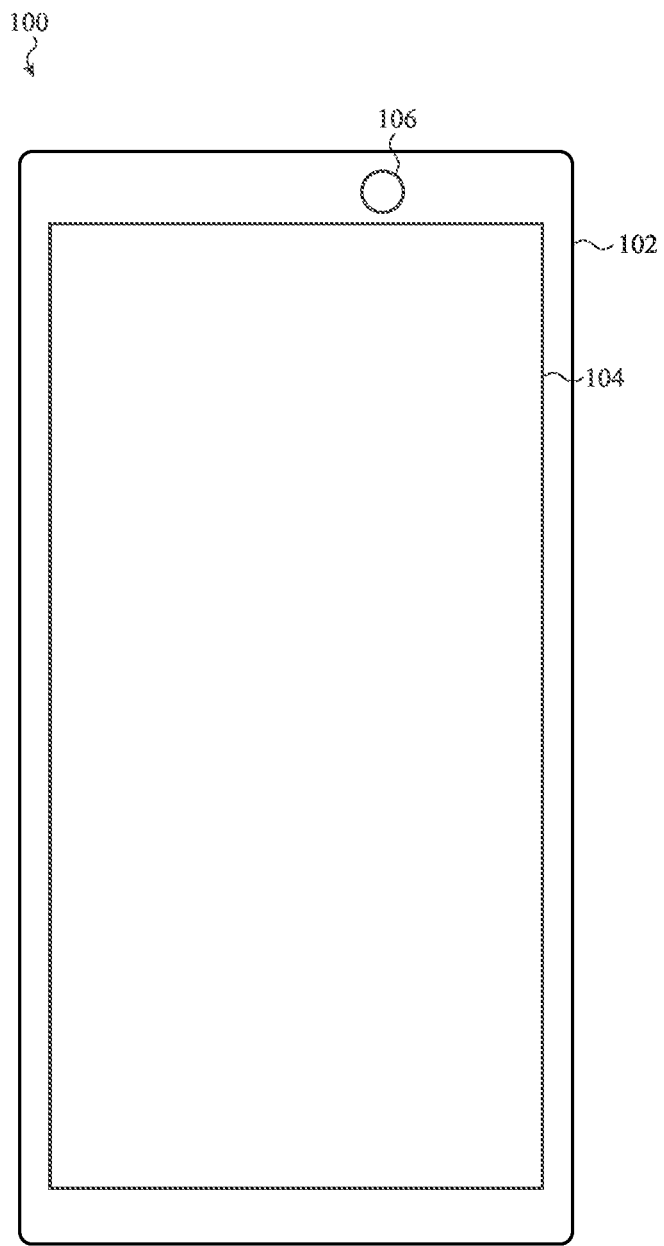
FIG. 1 depicts an example electronic device incorporating an image sensor, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an image sensor for an electronic device that is configured to seamlessly transition between different readout modes.

For simplicity of description, the embodiments that follow reference a complementary metal oxide semiconductor ("CMOS") image sensor that is sensitive to light in a traditionally visible spectral range—and methods for operating the same—but it may be appreciated that this is merely one example construction and that other image sensor topologies (e.g., charge coupled devices, non-visible light image sensors, front side or back side illuminated image sensors, flat panel detectors, and so on) may be suitable in other implementations.

A CMOS image sensor, such as described herein, includes—among other components, structures, and/or elements—an array of "photosites," referred to as a "photosite array." Typically, the photosite array includes a set of columns and a set of rows arranged in a grid. In some implementations, the term "pixel" can be used as a synonym for the term "photosites."

Each photosite of a photosite array includes at least one "photosensitive area." When a photosensitive area of a photosite is exposed to light for a particular exposure duration, the photosensitive area accumulates an electric charge. This is referred to as an "integration" operation because the accumulated electric charge corresponds to the total quantity of photons received at the photosensitive area over the exposure duration (herein, the "integration time"). In other words, the electric charge accumulated by a particular photosensitive area of a particular photosite of a photosite array is proportional to the brightness of light illuminating that photosensitive area for the integration time.

After integration, the image sensor "reads out" the accumulated electric charge (as a current, as a voltage, or as a digital value) of all or some of the photosensitive areas of all or some of the photosites as an initial step in a process to generate a digital image referred to herein as a "frame." The photosensitive areas of the photosites of a photosite array, such as described herein, are typically read out in groups. For example, in some embodiments, the photosensitive areas of the photosites of a photosite array can be grouped by rows or columns, read out in a row-wise or a column-wise sequence (e.g., read out sequentially by columns or read out sequentially by rows). In addition, after a readout operation is performed, each photosensitive area of each photosite of the photosite array is "reset" in order to discharge any residual electric charge prior to integration of the next frame.

For embodiments described herein, a CMOS image sensor (hereinafter, simply, "image sensor") is understood to be configured to output frames at a constant or, optionally, variable "frame rate." For each frame output from an image sensor, the image sensor typically performs at least three operations. First, the image sensor sends a "reset signal" to all or some of the photosites to reset all or some of the photosensitive areas of those photosites. Second, the image sensor waits for an integration time period to elapse. Third, the image sensor reads out the accumulated electric charge (e.g., as a voltage, as a current, or as a digital value) of all or some of the photosensitive areas of all or some of the photosites of the photosite array. The accumulated electric charge information, regardless of form or format (e.g., charge, voltage, digital value, and so on), is referred to herein for simplicity of description as "data" read out from the photosite array.

The image sensor assembles a frame based on the data read out from the photosite array. In some cases, the image sensor can apply one or more filters to, and/or perform one or more operations with, the data read out from the photosite array prior to (and/or subsequent to) assembling the frame. Examples include, but are not limited to: operations to apply one or more demosaicing/debayering filters; binning operations (e.g., combining charges accumulated by adjacent or nearby photosites); averaging operations; gain correction operations; and so on.

For simplicity of description, the embodiments that follow reference an image sensor that resets, integrates, and reads out each photosensitive area of each photosite of a photosite array in a row-wise sequence (e.g., the image sensor resets, integrates, and reads out photosensitive areas in a row then sequentially advances to the next row). It may be appreciated, however, that this is merely one example and that other embodiments can be configured to reset, integrate, and/or read out one or more photosensitive areas of one or more photosites of a photosite array in any other suitable manner.

More specifically, the embodiments that follow reference an image sensor configured to perform reset and readout operations on entire rows of photosites at a time. For example, to perform a reset operation, the image sensor can send a reset signal to each photosite in a selected row of photosites at substantially the same time in order to efficiently discharge any residual electric charge accumulated by any photosensitive area of any photosite in the selected row. The selected row can be addressed by a pointer referred to herein as the "reset pointer." Thereafter, the next row is selected by incrementing the reset pointer and the process is repeated until all rows of the photosite array have been reset.

Similarly, to perform a readout operation after a selected integration period has elapsed, each photosensitive area of each photosite in a selected row of photosites can be read out (e.g., into temporary storage capacitors, buffers, registers, analog-to-digital converters, amplifiers, and so on) substantially simultaneously. As with the reset operation described above, the selected row can be addressed by a pointer referred to herein as the "readout pointer." Thereafter, the readout pointer is incremented and the process is repeated until all rows have been read out.

In typical embodiments, the readout pointer of a particular frame leads the reset pointer of the next frame by a certain amount referred to herein as the "inter-frame delay." In other words, an image sensor—such as described herein—is generally configured to perform a readout operation simultaneously with a reset operation. More specifically, the image sensor is typically configured to perform a readout operation for a first frame (herein, "frame $F_N$") while simultaneously performing a reset operation for a second frame (herein, "frame $F_{N+1}$").

In many embodiments, the reset pointer of frame $F_{N+1}$ and the readout pointer of frame $F_N$ are synchronously incremented at a particular "scan rate." As may be appreciated, the pointers are incremented at the same time in order to reduce and/or eliminate switching noise in the image sensor. The scan rate (e.g., the rate at which the reset pointer and the readout pointer are incremented together) can be based, at least in part, on the total time required to reset and read out a particular row of photosites. Collectively, the total time required to reset and read out a particular row of photosites is referred to herein as the "line time."

As noted above, precise synchronization while incrementing the reset pointer of frame $F_{N+1}$ and the readout pointer of frame $F_N$ may be required to reduce and/or eliminate switching noise in the image sensor. To facilitate this synchronization, embodiments described herein include a timing controller that can include a vertical synchronization controller (herein, a "VSYNC" controller). The VSYNC controller can be any suitable digital or analog circuit, including one or more discrete or analog components, application-specific integrated circuits, general-purpose processors, and so on. The VSYNC controller can, in some examples, be implemented in whole or in part in software.

The VSYNC controller is configured to set an appropriate scan rate for the reset pointer of frame $F_{N+1}$ and the readout pointer of frame $F_N$ and to maintain synchronization while incrementing the two pointers. In some implementations, the VSYNC controller includes at least one asynchronous first-in first-out controller (also referred to as an "ASYNC FIFO") that can be used to buffer or otherwise receive and store addresses of the readout pointer of frame $F_N$ and the reset pointer of frame $F_{N+1}$. The rate at which addresses in the ASYNC FIFO are flushed may depend upon the scan rate maintained by the VSYNC controller. It may be appreciated, however, that this is merely one example; other circuit topologies can be used in other embodiments.

Further, as noted above, an image sensor such as described herein is typically configured to operate in multiple readout modes. Example readout modes include, but are not limited to: full-resolution readout modes (e.g., a readout mode in which a frame is generated by reading out each photosite of the image sensor); binning readout modes (e.g., a readout mode in which a frame is generated by combining charges accumulated by adjacent or nearby photosites with each other to reduce noise); photosite-skipping readout modes (e.g., a readout mode in which select photosites are skipped); oversampling readout modes (e.g., a readout mode in which more photosites are sampled than an output frame requires to increase noise tolerance); high frame-rate readout modes (e.g., a readout mode in which frame integration times are reduced to increase frame count per second); low frame-rate readout modes (e.g., a readout mode in which frame integration times are increased to decrease frame count per second); and so on.

It may be appreciated that different readout modes may be associated with different integration times, different readout times, different scan rates, different line times, and so on. For example, a binning readout mode may be associated with a different line time and scan rate than a full-resolution readout mode. As noted above, conventional image sensors undesirably interrupt frame output (e.g., inserting a vertical blanking frame) in order to transition between readout modes.

For embodiments described herein, however, an image sensor is configured to adjust the incrementation of the reset pointer of frame $F_{N+1}$ relative to the incrementation of the readout pointer of frame $F_N$ to smoothly transition between readout modes in real-time (e.g., transitioning from an "original readout mode" to a "target readout mode" without interrupting frame output).

For example, in some cases, the reset pointer of frame $F_{N+1}$ may selectively not increment when the readout pointer of frame $F_N$ increments. By selectively not incrementing, the reset pointer of frame $F_{N+1}$ gradually lags farther behind the readout pointer of frame $F_N$. Phrased in another non-limiting manner, the reset pointer of frame $F_{N+1}$ increments through the rows in the photosite array at a slower rate (e.g., a slower scan rate) than the readout pointer of frame $F_N$. In this manner, by controlling the number of times that the reset pointer of frame $F_{N+1}$ is not incremented when the readout pointer of frame $F_N$ is incremented, the image sensor can effectively control the scan rate of the reset pointer of frame $F_{N+1}$. Thereafter (and after an integration period has elapsed) the scan rate of the readout pointer of frame $F_{N+1}$ can be set to match the slowed scan rate of the reset pointer of frame $F_{N+1}$, thereby transitioning the image sensor to the target readout mode. To illustrate this example, Table 1 and Table 2 are provided below.

Table 1 corresponds to an example embodiment in which a photosite array includes ten rows. In this example, the readout pointer of frame $F_N$ is incremented once—or skipped—for every time unit t. Similarly, the reset pointer of frame $F_{N+1}$ is incremented once for every time unit t. The two frames $F_N$, $F_{N+1}$ are separated by an inter-frame delay of one time unit t and the scan rates of the readout pointer of frame $F_N$ and the reset pointer of frame $F_{N+1}$ are the same at one row per time unit t.

TABLE 1

| Time (t) | Readout pointer $F_N$ | Reset Pointer $F_{N+1}$ |
|---|---|---|
| 0 | Row 0 | — |
| 1 | Row 1 | Row 0 |
| 2 | Row 2 | Row 1 |
| 3 | Row 3 | Row 2 |
| 4 | Row 4 | Row 3 |
| 5 | Row 5 | Row 4 |
| 6 | Row 6 | Row 5 |
| 7 | Row 7 | Row 6 |
| 8 | Row 8 | Row 7 |
| 9 | Row 9 | Row 8 |
| 10 | — | Row 9 |

Table 2 corresponds to an example embodiment such as described above in which the image sensor transitions from an original readout mode to a target readout mode associated with a slower scan rate than the original readout mode.

More specifically, the reset pointer of frame $F_{N+1}$ in this example increments through the ten rows of the example photosite array at a slower rate than the readout pointer of frame $F_N$. In this example, the readout pointer of frame $F_N$ is incremented once, or skipped for every time unit t according to the scan rate of the original readout mode. In contrast, the reset pointer of frame $F_{N+1}$ is incremented three times for every four time units t, according to the scan rate of the target readout mode. In this example, the two frames $F_N$, $F_{N+1}$ remain separated by an inter-frame delay of one time unit t, but the effective scan rates are different. More specifically, the readout pointer of frame $F_N$ proceeds with a scan rate of one row per time unit t (e.g., the scan rate of the original readout mode) while the reset pointer of frame $F_{N+1}$ proceeds with a scan rate approximately equal to 0.75 rows per time unit t (e.g., the scan rate of the target readout mode).

TABLE 2

| Time (t) | Readout pointer $F_N$ | Reset Pointer $F_{N+1}$ |
|---|---|---|
| 0 | Row 0 | — |
| 1 | Row 1 | Row 0 |
| 2 | Row 2 | — |
| 3 | Row 3 | Row 1 |
| 4 | Row 4 | Row 2 |
| 5 | Row 5 | — |
| 6 | Row 6 | Row 3 |
| 7 | Row 7 | Row 4 |
| 8 | Row 8 | — |
| 9 | Row 9 | Row 5 |
| 10 | — | Row 6 |
| 11 | — | — |
| 12 | — | Row 7 |
| 13 | — | Row 8 |
| 14 | — | — |
| 15 | — | Row 9 |

As a result of the approach described in the preceding example, the scan rate of the reset pointer of frame $F_{N+1}$ can be changed to match the scan rate of the target readout mode, while still maintaining time synchronization with the readout pointer for frame $F_N$ to prevent and/or mitigate effects of switching noise. In another non-limiting phrasing, this example configuration smoothly transitions—in a single frame—from a higher scan rate readout mode for frame $F_N$ to a lower scan rate readout mode for frame $F_{N+1}$.

In another example configuration of an image sensor described herein, more than one row of photosites can be reset simultaneously. As a result of this approach, the effective scan rate of the reset pointer(s) of frame $F_{N+1}$ conforms, generally, to the scan rate of the target readout mode while still maintaining time synchronization with the scan rate of the current readout mode. In another non-limiting phrasing, this example configuration transitions from a lower scan rate readout mode to a higher scan rate readout mode by increasing the pace at which the reset pointers of frame $F_{N+1}$ increment relative to the pace at which the readout pointer of frame $F_N$ increments.

Table 3 corresponds to an example embodiment, such as described above, in which the image sensor transitions to a target readout mode associated with a faster scan rate than the original readout mode.

More specifically, the reset pointer of frame $F_{N+1}$ in this example, increments through the ten rows of the example photosite array at a faster rate than the readout pointer of frame $F_N$. In this example, the readout pointer of frame $F_N$ is incremented once for every time unit t according to the scan rate of the original readout mode. In contrast, the reset pointer of frame $F_{N+1}$ is delayed by a certain amount (e.g., 6 time units t) and, thereafter, two rows on average are reset simultaneously for every one time unit t, according to the scan rate of the target readout mode. More specifically, the readout pointer of frame $F_N$ proceeds with a scan rate of one row per time unit t (e.g., the scan rate of the original readout mode) while the reset pointer of frame $F_{N+1}$ proceeds with a scan rate approximately equal to two rows per time unit t (e.g., the scan rate of the target readout mode).

TABLE 3

| Time (t) | Readout pointer $F_N$ | Reset Pointer $F_{N+1}$ |
|---|---|---|
| 0 | Row 0 | — |
| 1 | Row 1 | — |
| 2 | Row 2 | — |
| 3 | Row 3 | — |
| 4 | Row 4 | — |
| 5 | Row 5 | — |
| 6 | Row 6 | Row 0, Row 1 |
| 7 | Row 7 | Row 2, Row 3 |
| 8 | Row 8 | Row 4, Row 5 |
| 9 | Row 9 | Row 6, Row 7 |
| 10 | — | Row 8, Row 9 |

As a result of the approach described in reference to the preceding example, the scan rate of the reset pointer of frame $F_{N+1}$ can be changed to match the scan rate of the target readout mode, while still maintaining time synchronization with the readout pointer for frame $F_N$ to prevent and/or mitigate effects of switching noise. In another non-limiting phrasing, this example configuration smoothly transitions—in a single frame—from a lower scan rate readout mode for frame $F_N$ to a higher scan rate readout mode for frame $F_{N+1}$.

In some cases, after a transition from a first scan rate to a second scan rate is performed, line timing may also be changed (e.g., increased or decreased).

It may be appreciated that the preceding examples described in reference to Table 2 and Table 3 are not exhaustive. To the contrary, it may be appreciated that the systems, methods, and techniques described herein can be applied to effect real-time and/or smooth transitions between any number of suitable readout modes.

These foregoing and other embodiments are discussed below with reference to FIGS. 1-7. However, those skilled in the art will readily appreciate that the detailed description given herein with respect to these figures is for explanatory purposes only and should not be construed as limiting.

FIG. 1 depicts an example electronic device 100. The electronic device 100 includes a housing 102, a display 104, and an image sensor 106.

The image sensor 106 is disposed within the housing 102, and is positioned to align with—and/or extend at least partially through—an aperture defined by the housing 102. As illustrated, the aperture is circular, but this may not be required. In other cases, the aperture may not be required at all; the image sensor 106 can be positioned behind a transparent portion of the housing.

As with other embodiments described herein, the image sensor 106 includes a photosite array of individual photosites also referred to as "pixels." Typically, a photosite array is rectangular and the photosites of the array are arranged in a regular grid pattern of columns and rows. Further, a photosite array is typically planar, although in some embodiments, a photosite array can be concave or convex or may take another shape.

Each photosite of the photosite array can include one or more of, without limitation: a photosensitive area (e.g., photodiode, charge-coupled device, and so on); a reset switch or circuit; a microlens; a hot mirror (e.g., or other band stop optical filter); a color filter (e.g., a portion of a Bayer pattern); an output amplifier (e.g., charge amplifier, voltage amplifier, trans-impedance amplifier, and so on); an analog-to-digital converter; a charge storage capacitor; digital memory; and so on.

Some image sensor embodiments can include photosites with more than one photosensitive area. In these examples, different photosensitive areas may be formed from different materials, or material combinations, and/or may have different photosensitivity or electrical characteristics (e.g., rise time, fall time, reverse bias, dark current, and so on). In another example, a first photosensitive area is positioned adjacent to a second photosensitive area of the same photosite to facilitate autofocus adjustments or parallax-based depth sensing.

For simplicity of description, the image sensor 106 is understood to include a photosite array in which each photosite includes a single photosensitive area defined by a semiconductor material (e.g., silicon, germanium, indium gallium arsenide, gallium phosphide, and so on). It is appreciated, however, that this is merely one example and, that in other implementations, a photosite can include more than one photosensitive area and/or an image sensor can include a photosite array in which some photosites include more than one photosensitive area and some photosites include only a single photosensitive area.

It may be appreciated that the foregoing description of FIG. 1, and the various alternatives thereof and variations thereto, are presented, generally, for purposes of explanation, and to facilitate a thorough understanding of various possible configurations of an electronic device incorporating an image sensor such as described herein. However, it will be apparent to one skilled in the art that some of the specific details presented herein may not be required in order to practice a particular described embodiment, or an equivalent thereof.

For example, although the electronic device 100 is depicted as a cellular phone, it may be appreciated that other electronic devices can incorporate an image sensor such as described herein including, but not limited to: tablet devices; laptop devices; wearable devices; desktop computers; computing accessories; peripheral input devices; vehicle control devices; mobile entertainment devices; augmented reality devices; virtual reality devices; industrial control devices; digital wallet devices; home security devices; business security devices; and so on.

Further, it is appreciated that an electronic device, such as the electronic device 100, can include any number of image sensors. In some examples, an electronic device can include image sensors oriented outwardly from a front surface of a housing (such as shown in FIG. 1), oriented outwardly from a rear or back surface of a housing, or oriented outwardly from a side surface of a housing. In some embodiments, an electronic device can include multiple image sensors, some of which may be conventionally configured image sensors and some of which may be image sensors such as described herein.

Further, it is appreciated that the electronic device 100—or, more generally, any portable or stationary electronic device incorporating one or more image sensors such as described herein—can additionally include, without limitation, a processor, memory, power supply and/or battery, network connections, sensors, input/output ports, acoustic elements, haptic elements, digital and/or analog circuits for performing and/or coordinating tasks, and so on. For simplicity of illustration, the electronic device 100 is depicted in FIG. 1 without many of these elements, each of which may be included, partially and/or entirely, within the housing 102 and may be operationally or functionally associated with, or coupled to, the display 104 of the electronic device 100 or the image sensor 106 of the electronic device 100.

For example, a processor of the electronic device 100 can be configured to access and execute instructions stored in a memory in order to instantiate any number of suitable classes, objects, virtual machines, threads, pipelines, and/or routines to perform, monitor, and/or coordinate one or more operations of the electronic device 100 and/or the image sensor 106. In some cases, the processor can be communicably coupled—either directly (e.g., via general-purpose input/output pins) or indirectly (e.g., via an intermediary circuit or integrated circuit)—to one or more of the hardware components of the electronic device 100, including the display 104 and the image sensor 106. In this manner, frames output by the image sensor 106 can be shown and/or rendered on the display 104 in substantially real time. In other embodiments, the processor may not be a required intermediary between the display 104 and the image sensor 106; frames output by the image sensor 106 can be received directly by the display 104.

In one embodiment, the processor can cause the display 104 to render a graphical user interface. In many cases, the graphical user interface can include a live view of frames output from the image sensor 106. As a result of this construction, a user of the electronic device 100 can observe a scene captured by the image sensor 106 in substantially real time.

In further examples, the processor of the electronic device 100 can render the graphical user interface while monitoring a user input sensor (e.g., capacitive touch sensor, capacitive force sensor, and so on) to detect one or more characteristics of a user's physical interaction with the display 104 and/or the user's physical interaction with the live view of frames output from the image sensor 106. Example detectable characteristics can include, but are not limited to, characteristics of: touch input events (e.g., location and duration); force input events (e.g., location, duration, and magnitude); touch gesture events (e.g., swipe, zoom in, zoom out, rotate, pinch); force gesture events (e.g., heavy press, light press); and so on.

As a result of this construction, a user of the electronic device 100 is encouraged to interact with content shown on the display 104, including the live view of frames output from the image sensor 106. In response to detecting specific user interactions and/or specific events (herein, generally, "user input"), the processor and/or another digital or analog circuit in the electronic device 100 can perform a specific task or operation related to one or more of the display 104, the graphical user interface, and/or the image sensor 106.

For example, in one embodiment, the graphical user interface shown on the display 104 includes a live view of frames output from the image sensor 106 operating in a particular readout mode suitable for capturing high-resolution images of a well-illuminated scene (such as a full-resolution readout mode). In some circumstances, a user of the electronic device 100 may prefer to change the readout mode of the image sensor 106 to a readout mode more suitable for capturing low-noise images of a poorly-illuminated scene (such as a binned readout mode). In this example, the user can interact with the graphical user interface (e.g., by selecting a button, by swiping in a particular direction, by applying a force beyond a threshold, and so on) to instruct the electronic device 100 to change the readout mode of the image sensor 106. In response to receiving the user input, the processor—and/or another digital or analog circuit of the electronic device 100 or the image sensor 106—can cause the image sensor 106 to change readout modes.

Accordingly, generally and broadly, it is understood that in some embodiments a graphical user interface of an electronic device can be used to trigger changes in readout modes of an image sensor, such as described herein. In other cases, however, an input sensor can change readout modes in response to other triggers, states, or events such as, but not limited to: a setting of the electronic device; output received from a remote or local application; output from an image processing algorithm; and so on.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 2:
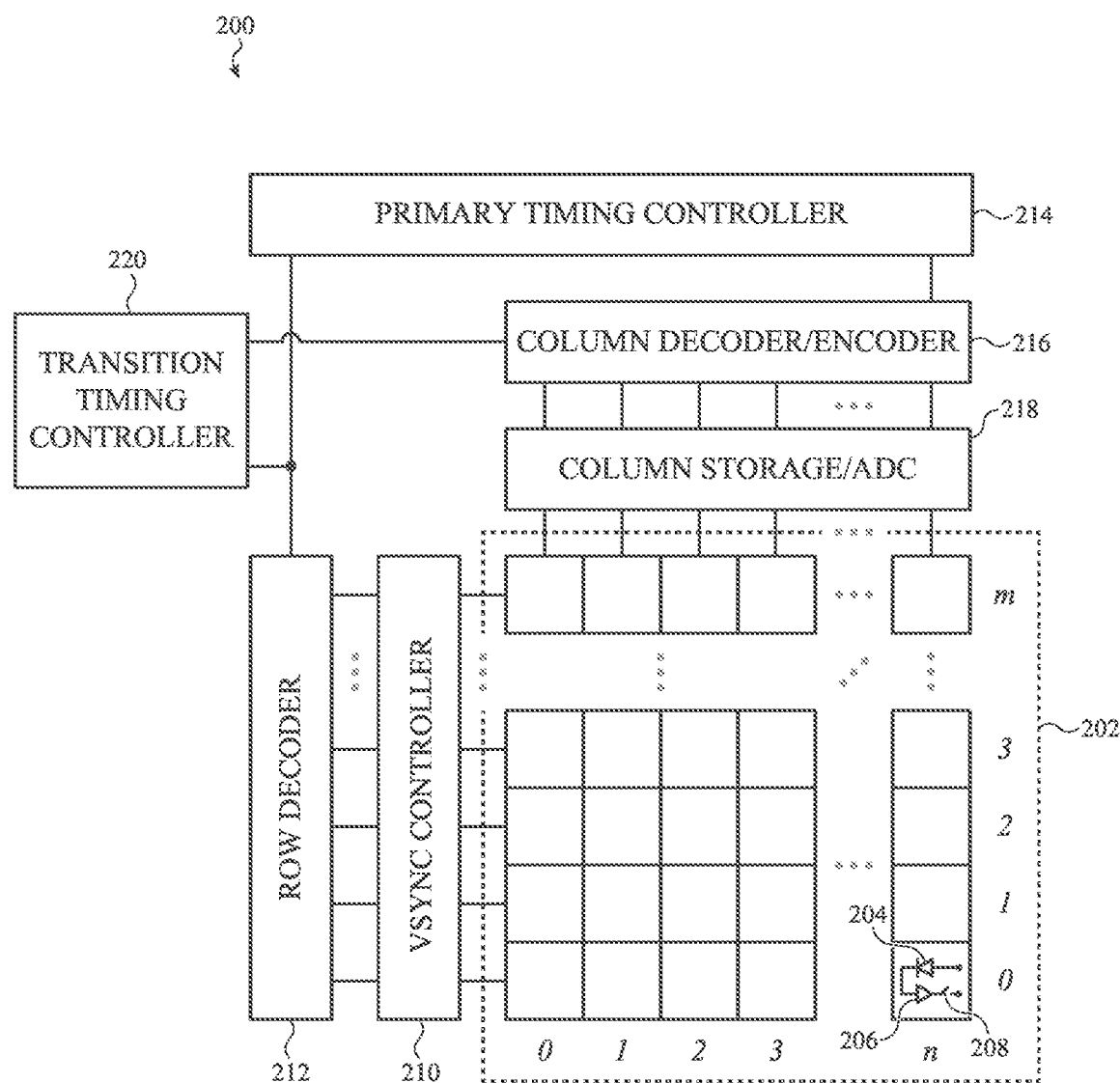
FIG. 2 is a simplified system diagram of an image sensor configured for seamless transition between readout modes, such as described herein.

FIG. 2 is a simplified system diagram of an image sensor 200, such as described herein. The image sensor 200 includes a photosite array 202 that, in turn, includes m rows and n columns of photosites.

As with other embodiments described herein, the photosites of the photosite array 202 can each include a number of discrete circuits and/or components that may vary from embodiment to embodiment. For simplicity of description and illustration, the embodiments that follow reference a single photosite positioned within the photosite array 202 at position (0, n); it may be appreciated that other photosites of the photosite array 202 may be similarly configured. In other examples, however, the photosites of the photosite array 202 may be configured in a different manner than shown and described relative to the photosite (0, n).

In the illustrated example, the photosite (0, n) includes a photosensitive element 204 (e.g., a photodiode) defining a photosensitive area that is sensitive to light in a particular spectral range. In typical examples, the photosensitive area is sensitive to light in a traditionally visible spectral range, but this may not be required of all embodiments. For example, in some cases, the photosensitive area of the photosensitive element 204 may be sensitive to infrared light.

In many examples, the photosite (0, n) also includes an amplifier 206. Output from the amplifier 206 is gated by a switch 208.

As noted with respect to other embodiments described herein, when the photosite array 202 of the image sensor 200 is exposed to light during an integration operation, electric charge is accumulated on photosensitive area(s) of the photosensitive element 204. During a readout operation, the switch 208 can be closed, connecting an output of the amplifier 206 to a readout circuit of the image sensor 200. In further examples, the photosite (0, n) can include a second switch associated with a reset operation; when closed (or in other circuit topologies, opened) the second switch can discharge any latent charge held by the photosensitive element 204.

As noted with respect to other embodiments described herein, the image sensor 200 is configured to perform readout operations and reset operations in a row-wise fashion. To facilitate this mode of operation, the image sensor 200 includes a vertical synchronization controller 210 configured to apply one or more signals (e.g., readout signals and/or reset signals) to one or more rows simultaneously, typically in phase with a clock signal (not shown). In one example, frame $F_N$ can be read out while frame $F_{N+1}$ is being reset; the readout signal and the reset signals (of the next frame) are applied to rows in phase with one another. In this example, the vertical synchronization controller 210 can be configured to release and/or otherwise send a reset signal (for frame $F_{N+1}$) to a first row of the set of rows at the same time a readout signal (for frame $F_N$) is sent to a second row of the set of rows. By maintaining precise timing between the readout signals associated with frame $F_N$ and the reset signals associated with frame $F_{N+1}$, switching noise can be mitigated.

The specific row (or rows) driven by the vertical synchronization controller 210 can be selected by a row decoder 212. The row decoder 212 enables a specific row trace from a set of row traces (e.g., a bus) coupling the vertical synchronization controller 210 and the row decoder 212 in response to receiving an address and/or a pointer—such as a readout pointer or a reset pointer, such as described above—from a timing controller 214.

In one specific example, the timing controller 214 can initiate a reset operation by setting the reset pointer to reference row 0. Next, the timing controller 214 sends the reset pointer to the row decoder 212. The row decoder 212 decodes the pointer and determines a row trace associated with the reset pointer. Next, the row decoder 212 sends a signal via the row trace to the vertical synchronization controller 210. The vertical synchronization controller 210 buffers the received signal until a time at which it is appropriate to perform the readout operation on row zero. In one example, the vertical synchronization controller 210 buffers the received signal until an edge of a clock signal (not shown) is generated or received by the vertical synchronization controller 210.

Thereafter, and after a delay based on a scan rate (such as described above), the timing controller 214 increments the reset pointer to reference row one, which is decoded by the row decoder 212 into a specific row trace. Next, as with the previous example, the row decoder 212 sends a signal via the row trace to the vertical synchronization controller 210. The vertical synchronization controller 210 buffers the received signal until a time at which it is appropriate to perform the reset operation on row one.

The image sensor 200 includes a readout circuit. The readout circuit can include, in some examples, an (optional) column decoder/encoder 216 and an (optional) analog to digital converter 218. Much like the row decoder 212, the column decoder/encoder 216 can be configured to translate physical trace locations into addresses, and vice versa. The analog to digital converter 218 is configured to convert voltage, current, or charge information received from one or more photosites into a digital representation of an appropriate or selected bit depth (e.g., 8-bit, 10-bit, 12-bit, 16-bit, and so on). Thereafter, optionally, the output from the analog to digital converter 218 can be received by a gain correction controller (not shown) that can provide for gain correction.

In one specific example, the timing controller 214 can initiate a readout operation by setting the readout pointer to reference row 0. Next, the timing controller 214 sends the readout pointer to the row decoder 212. The row decoder 212 decodes the pointer and determines a row trace associated with the readout pointer. Next, the row decoder 212 sends a signal via the row trace to the vertical synchronization controller 210. The vertical synchronization controller 210 buffers the received signal until a time at which it is appropriate to perform the readout operation on row zero.

Once the vertical synchronization controller 210 applies the readout signal to row zero, the accumulated electrical charge of each photosensitive element of each photosite in row zero is converted into a digital value (either serially or in parallel) by the analog to digital converter 218. Thereafter, output from the column decoder/encoder 216 can be used to associate the digital value(s) output from the analog to digital converter 218 with specific row and column addresses.

Thereafter, and after a delay based on a scan rate such as described above, the timing controller 214 increments the readout pointer to reference row 1, and the readout operation continues.

As with other embodiments described herein, the image sensor 200 can be configured to adjust the incrementation of reset pointers relative to the incrementation of readout pointers in order to smoothly transition between readout modes in real-time. To facilitate transitions such as these, the image sensor 200 includes a transition timing controller 220. The transition timing controller 220 is configured—as noted above—to either reduce or increase the effective scan rate of a reset pointer relative the scan rate of a readout pointer in order to transition to a slower or faster scan rate for the subsequent frame. In other cases, a transition timing controller 220 may not be required; in these examples, the vertical synchronization controller 210 may be configured to reduce or increase the effective scan rate of a reset pointer relative to the scan rate of a readout pointer in order to transition to a faster or slower scan rate for the subsequent frame. Operations that can be performed by a transition timing controller 220—and/or a vertical synchronization controller 210—are described in greater detail below in reference to FIGS. 3A-5.

Figure 3A:
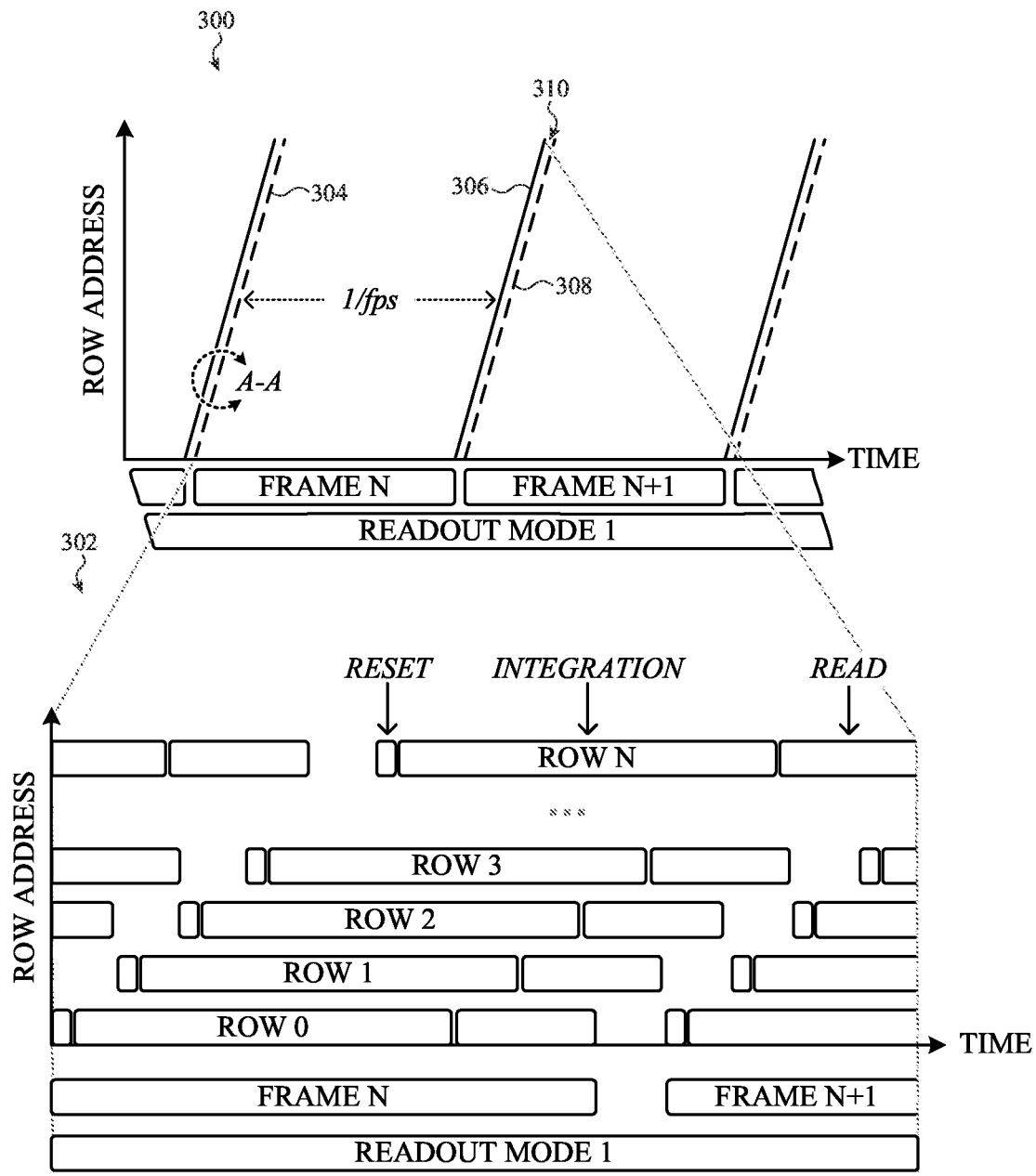
FIG. 3A is a timing diagram illustrating operations of an image sensor operating in a first readout mode, such as described herein.

For example, FIG. 3A depicts a timing diagram 300—and a detailed view of the same, identified as the detailed timing diagram 302—illustrating operations of an image sensor, such as the image sensor 200 depicted in FIG. 2, operating in a selected readout mode. As noted with respect to other embodiments described herein, the selected readout mode can specify a line time (e.g., a specific reset duration, integration duration, and/or readout duration) and/or a scan rate.

In this figure, two frames are shown and identified as the frames $F_N$ and $F_{N+1}$. The reset pointer of frame $F_N$ is incremented at a scan rate represented by the slope of the dotted line 304. In other words the dotted line 304 depicts a sequence of reset pointer increments or, more generally, a sequence of reset operations performed on sequential rows of the photosite array of the image sensor.

Similarly, the readout pointer of frame $F_N$ is incremented at a scan rate represented by the slope of the solid line 306. In other words the solid line 306 depicts a sequence of readout pointer increments or, more generally, a sequence of readout operations performed on sequential rows of the photosite array of the image sensor.

The reset pointer of frame $F_{N+1}$ is incremented at a scan rate represented by the slope of the dotted line 308. As with other embodiments described herein, the readout pointer of frame $F_N$ leads the reset pointer of frame $F_{N+1}$ by an inter-frame delay 310.

In this example, the readout mode of both frames $F_N$ and $F_{N+1}$ are the same. In other words, the read out and reset pointers of the frames $F_N$ and $F_{N+1}$ are incremented at precisely the same scan rate, as shown by the parallel relationship between the dotted lines 304, 308 and the solid line 306. As noted above, incrementing a readout pointer and a reset pointer at the same rate—or, in another non-limiting phrasing, performing readout and reset operations in a timed/synchronized sequence—reduces and/or eliminates switching noise in an image sensor.

Figure 3B:
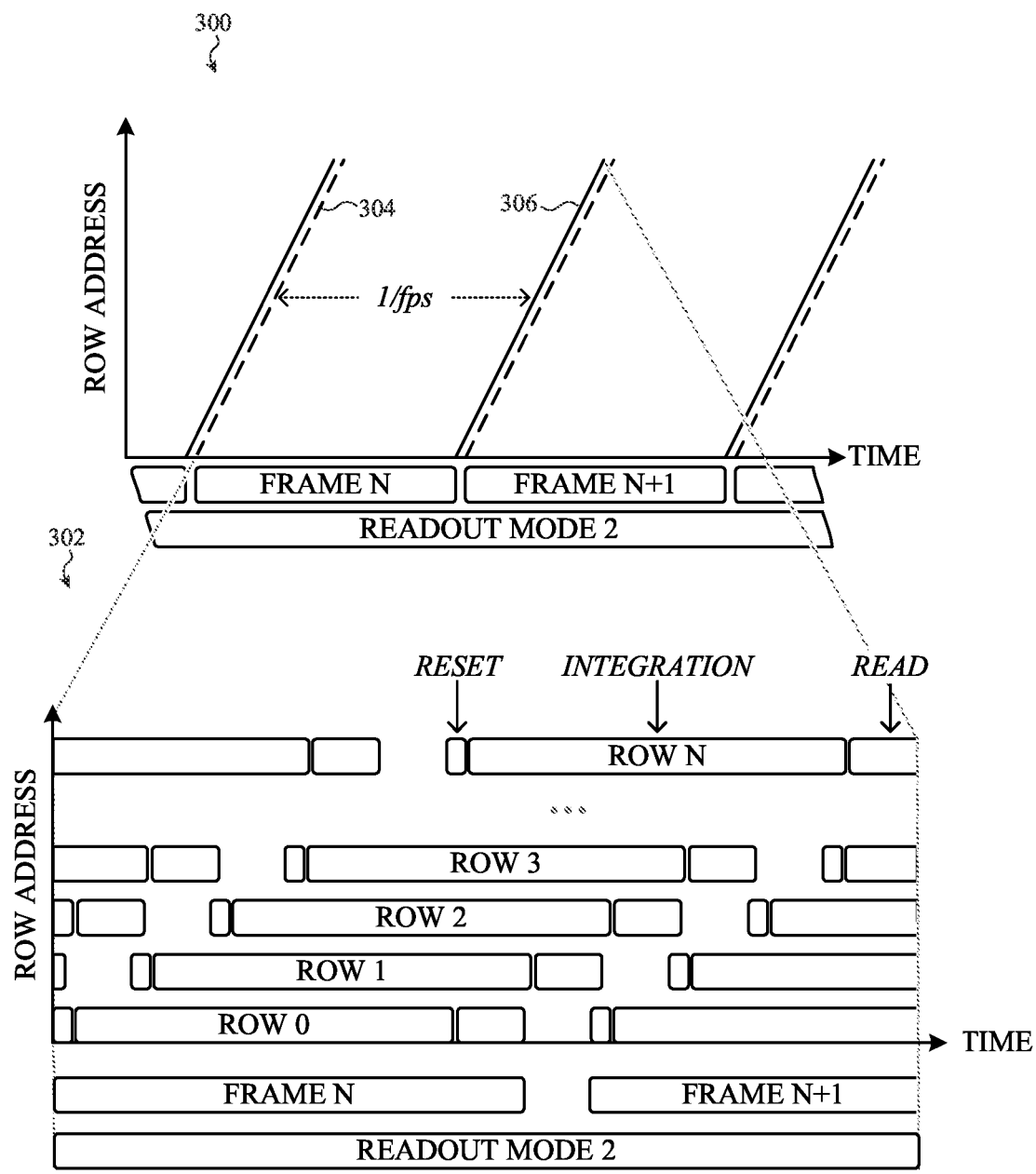
FIG. 3B is a timing diagram illustrating operations of an image sensor operating in a second readout mode, such as described herein.

FIG. 3B depicts the timing diagram 300 operating in a different readout mode associated with a slower scan rate than the readout mode illustrated in FIG. 3A. In this example, the slower scan rate can be influenced, at least in part, by a shorter readout duration than the readout mode shown in FIG. 3A.

Figure 4:
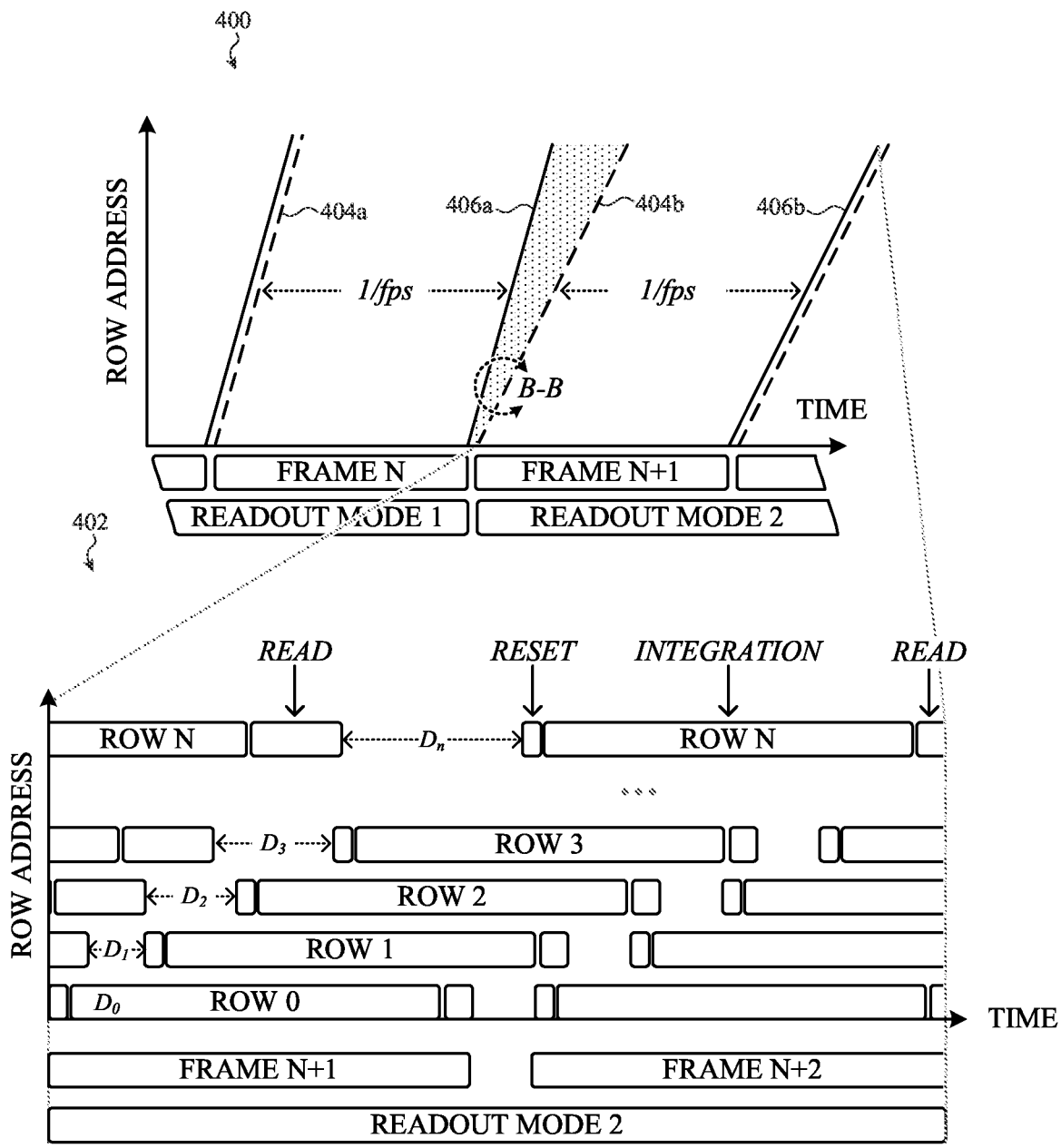
FIG. 4 is a timing diagram depicting a seamless transition between readout modes of an image sensor, such as described herein.

FIG. 4 depicts a timing diagram 400—and a detailed view of the same, identified as the detailed timing diagram 402—illustrating operations of an image sensor, such as the image sensor 200 depicted in FIG. 2. In this example, the image sensor transitions from a high scan rate readout mode to a low scan rate readout mode.

In this figure, as with the embodiment depicted in FIGS. 3A-3B, two frames are shown and identified as the frames $F_N$ and $F_{N+1}$. The reset pointer of frame $F_N$ is incremented at a first scan rate represented by the slope of the dotted line 404a. Similarly, the readout pointer of frame $F_N$ is incremented at the first scan rate represented by the slope of the solid line 406a.

In this embodiment, the reset pointer of frame $F_{N+1}$ is incremented at a second scan rate represented by the slope of the dotted line 404b. Similarly, the readout pointer of frame $F_{N+1}$ is incremented at the second scan rate represented by the slope of the solid line 406b. In order to effect the second scan rate, and as noted with respect to other embodiments described herein, the reset pointer of frame $F_{N+1}$ may selectively not increment when the readout pointer of frame $F_N$ increments. By selectively not incrementing, the reset pointer of frame $F_{N+1}$ gradually lags farther behind the readout pointer of frame $F_N$. This is shown in the figure by the progressively larger delay $D_1$-$D_n$.

As described above, by controlling the number of times that the reset pointer of frame $F_{N+1}$ is not incremented when the readout pointer of frame $F_N$ is incremented, the image sensor can effectively control the scan rate of the reset pointer of frame $F_{N+1}$. Thereafter and after the integration period has elapsed, the scan rate of the readout pointer of frame $F_{N+1}$ can be set to match the slowed scan rate of the reset pointer of frame $F_{N+1}$, thereby transitioning the image sensor to the lower readout mode.

Figure 5:
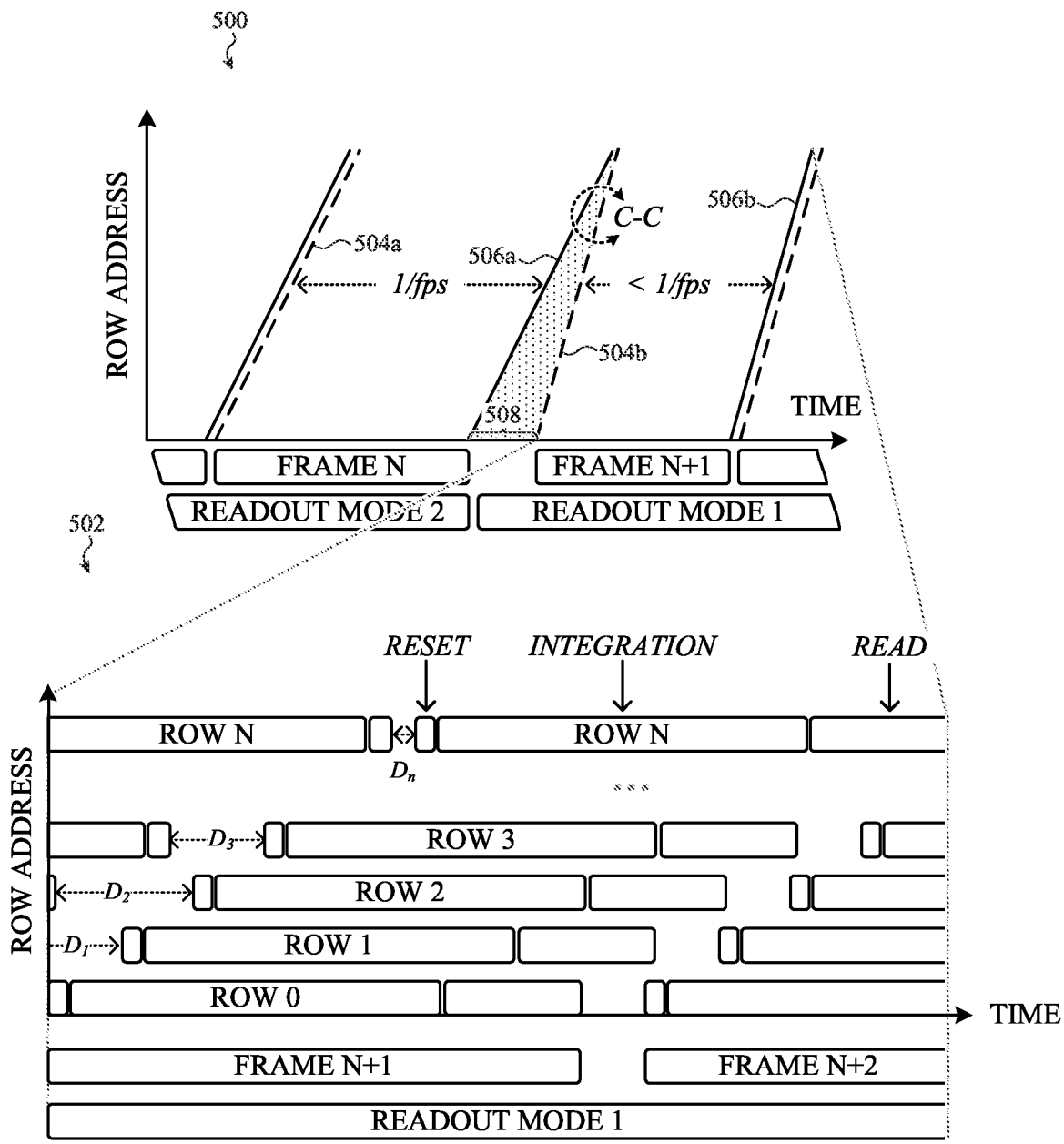
FIG. 5 is a timing diagram depicting a seamless transition between readout modes of an image sensor, such as described herein.

FIG. 5 depicts a timing diagram 500—and a detailed view of the same, identified as the detailed timing diagram 502—illustrating operations of an image sensor, such as the image sensor 200 depicted in FIG. 2. In this example, the image sensor transitions from a low scan rate readout mode to a high scan rate readout mode.

In this figure, as with the embodiment depicted in FIGS. 3A-4, two frames are shown and identified as the frames $F_N$ and $F_{N+1}$. The reset pointer of frame $F_N$ is incremented at a first scan rate represented by the slope of the dotted line 504a. Similarly, the readout pointer of frame $F_N$ is incremented at the first scan rate represented by the slope of the solid line 506a.

In this embodiment, the reset pointer of frame $F_{N+1}$ is incremented at a second scan rate represented by the slope of the dotted line 504b. Similarly, the readout pointer of frame $F_{N+1}$ is incremented at the second scan rate represented by the slope of the solid line 506b. In order to effect the second scan rate, and as noted with respect to other embodiments described herein, the reset pointer of frame $F_{N+1}$ may selectively reset multiple rows at a time when the readout pointer of frame $F_N$ increments.

In addition, the image sensor is configured to delay resetting the first row of frame $F_{N+1}$. The delay, referred to as the staggered start delay 508, is set such that the reset pointer of frame $F_{N+1}$ does not overtake the readout pointer of frame $F_N$.

In many cases, the staggered start delay 508 has the effect of decreasing integration time in the frame $F_{N+1}$. In these examples, one or more gain correction operations can be optionally performed on the frame $F_{N+1}$.

In this manner, by selectively incrementing multiple rows simultaneously, the reset pointer of frame $F_{N+1}$ gradually advances toward the readout pointer of frame $F_N$. This is shown in the figure by the progressively smaller delays $D_1$-$D_n$.

As described above, by controlling the number of times and the manner in which multiple rows of frame $F_{N+1}$ are simultaneously reset when the readout pointer of frame $F_N$ is incremented, the image sensor can effectively control the scan rate of the reset pointer of frame $F_{N+1}$. Thereafter, and after the integration period has elapsed, the scan rate of the readout pointer of frame $F_{N+1}$ can be set to match the faster scan rate of the reset pointer of frame $F_{N+1}$, thereby transitioning the image sensor to the higher readout mode.

Figure 6A:
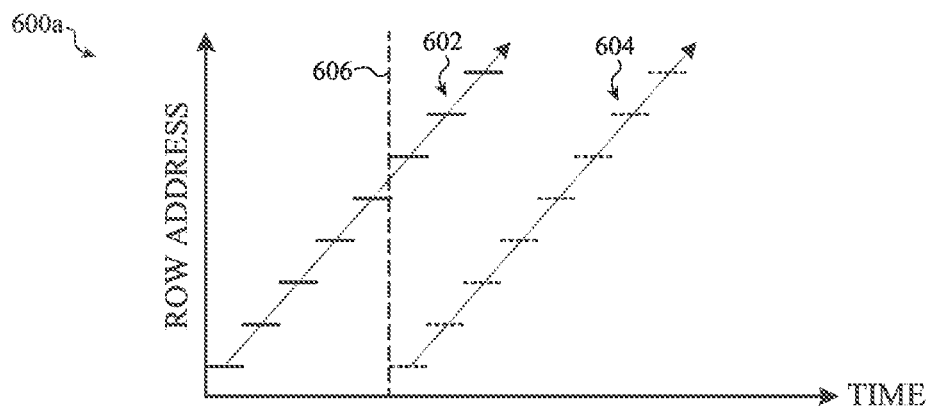
FIG. 6A is a detail view of the enclosed circle A-A of the timing diagram of FIG. 3A, showing synchronization between read and reset signals applied when an image sensor, such as described herein, is continuously operated in a selected readout mode.

FIG. 6A is a detail view of the enclosed circle A-A of the timing diagram of FIG. 3A. This figure shows two step-wise functions corresponding to the operations of synchronously incrementing the readout pointer of frame $F_N$ and the reset pointer of frame $F_{N+1}$. More specifically, the operation of incrementing the readout pointer of frame $F_N$ is shown by the step-wise function 602 and the operation of incrementing the reset pointer of frame $F_{N+1}$ is shown by the step-wise function 604. As shown by the reference line 606, the step-wise function 602 and the step-wise function 604 are in phase, thereby reducing switching noise in the image sensor. Two arrows are shown generally through the centers of the step-wise functions 602, 604 illustrating that the average or effective scan rates of the readout pointer of frame $F_N$ and the reset pointer of frame $F_{N+1}$ are identical.

Figure 6B:
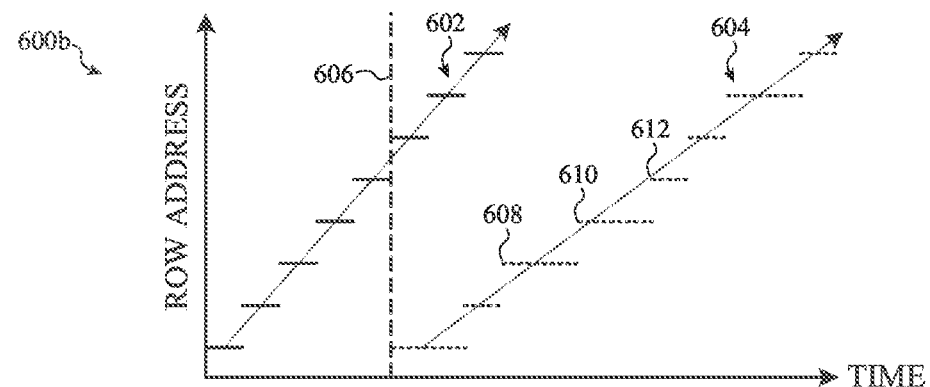
FIG. 6B is a detail view of the enclosed circle B-B of the timing diagram of FIG. 4, showing synchronization between read and reset signals applied when an image sensor, such as described herein, is seamlessly transitioned between readout modes.

FIG. 6B is a detail view of the enclosed circle B-B of the timing diagram of FIG. 4. As with other embodiments described herein, the figure shows two step-wise functions corresponding to the operations of synchronously incrementing the readout pointer of frame $F_N$ and the reset pointer of frame $F_{N+1}$, while gradually changing the average or effective scan rate of the reset pointer of frame $F_{N+1}$.

More specifically, the operation of incrementing the readout pointer of frame $F_N$ is shown by the step-wise function 602 and the operation of incrementing the reset pointer of frame $F_{N+1}$ is shown by the step-wise function 604. As shown by the reference line 606, the rising edges of the step-wise function 602 and the step-wise function 604 are in phase, thereby reducing switching noise in the image sensor. Phrased in another way, the readout pointer incrementation illustrated by the step-wise function 602 is in phase with the reset pointer incrementation illustrated by the step-wise function 604.

In this embodiment, however, certain selected steps of the step-wise function 604 are skipped and/or repeated. For example, incrementing of the step 608 is skipped once (e.g., the respective row is reset at least once), effectively doubling the step's duration. Similarly, the step 610 is skipped once (e.g., the respective row is reset at least once), effectively doubling the step's duration. Other steps, such as the step 612 may not be skipped. In one phrasing, the step-wise function 604 is selectively "jittered" in order to affect a scan rate different from the step-wise function 602 while still maintaining time/phase synchronization with the step-wise function 602.

As with the embodiment described in reference to FIG. 6A, two arrows are shown generally through the centers of the step-wise functions 602, 604 illustrating that the scan rates of the readout pointer of frame $F_N$ and the reset pointer of frame $F_{N+1}$ are different. In particular, the figure illustrates that the scan rate of the reset pointer of frame $F_{N+1}$ is less than that of the readout pointer of frame $F_N$.

Figure 6C:
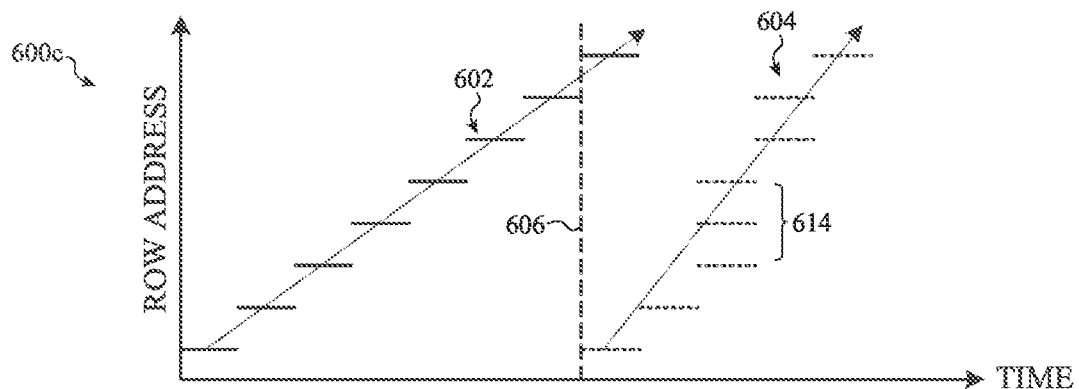
FIG. 6C is a detail view of the enclosed circle C-C of the timing diagram of FIG. 5, showing synchronization between read and reset signals applied when an image sensor, such as described herein, is seamlessly transitioned between readout modes.

FIG. 6C is a detail view of the enclosed circle C-C of the timing diagram of FIG. 5. As with other embodiments described herein, the figure shows two step-wise functions corresponding to the operations of synchronously incrementing the readout pointer of frame $F_N$ and the reset pointer of frame $F_{N+1}$, while gradually changing the effective scan rate of the reset pointer of frame $F_{N+1}$.

More specifically, as with the embodiment described in reference to FIG. 6B, the operation of incrementing the readout pointer of frame $F_N$ is shown by the step-wise function 602 and the operation of incrementing the reset pointer of frame $F_{N+1}$ is shown by the step-wise function 604. As shown by the reference line 606, the rising edges of the step-wise function 602 and the step-wise function 604 are in phase, thereby reducing switching noise in the image sensor.

In this embodiment, however, certain selected steps of the step-wise function 604 are performed in groups. In other words, certain rows can be reset at the same time. For example, each step in the group of three steps 614 is reset at the same time. In one phrasing, the step-wise function 604 is selectively "jittered" in order to affect a scan rate different from the step-wise function 602 while still maintaining time/phase synchronization with the step-wise function 602.

As with the embodiment described in reference to FIGS. 6A-6B, two arrows are shown generally through the centers of the step-wise functions 602, 604 illustrating that the scan rates of the readout pointer of frame $F_N$ and the reset pointer of frame $F_{N+1}$ are different. In particular, the figure illustrates that the scan rate of the reset pointer of frame $F_{N+1}$ is greater than that of the readout pointer of frame $F_N$.

It may be appreciated that the foregoing description of FIGS. 2-5, and the various alternatives thereof and variations thereto are presented, generally, for purposes of explanation, and to facilitate a thorough understanding of various possible configurations of an electronic device incorporating an image sensor such as described herein. However, it will be apparent to one skilled in the art that some of the specific details presented herein may not be required in order to practice a particular described embodiment, or an equivalent thereof.

For example, it may be appreciated that a linear or substantially linear relationship between the scan rates of the readout pointer of frame $F_N$ and the reset pointer of frame $F_{N+1}$ may not be required. In some cases, the scan rate of the reset pointer of frame $F_{N+1}$ may vary according to a curve or function.

Further, although only two readout modes are described in reference to the foregoing embodiments, it may be appreciated that an image sensor such as described herein can transition to and between any number of readout modes. In some examples, multiple transitions can occur in sequence. For example, the image sensor may transition from a first readout mode at frame $F_N$, to a second readout mode at frame $F_{N+1}$, to a third readout mode at frame $F_{N+2}$.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 7:
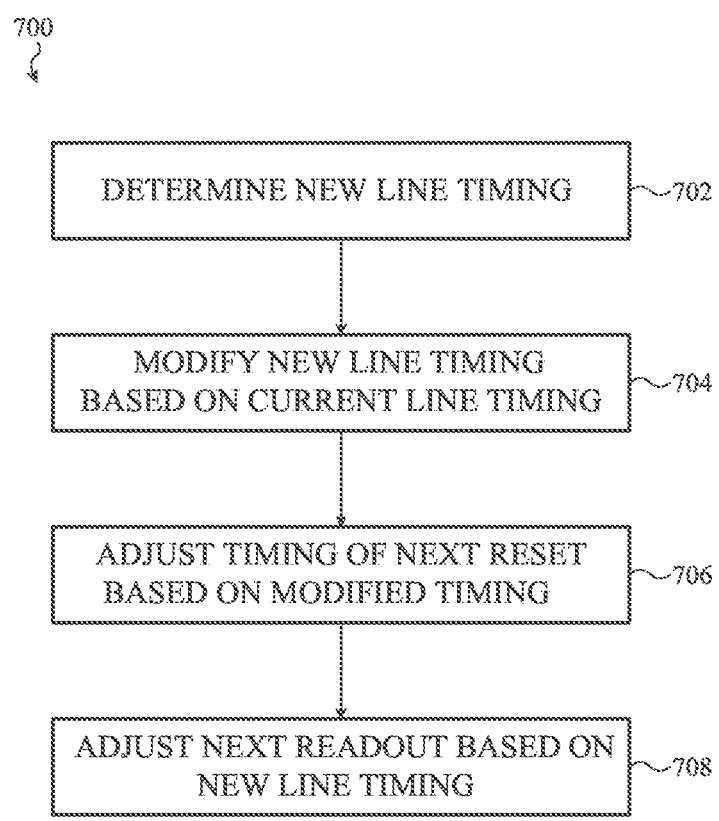
FIG. 7 is a flowchart depicting example operations of a method of synchronizing a readout signal and a reset signal by an image sensor, such as described herein.

FIG. 7 is a flowchart depicting example operations of a method of synchronizing a readout signal and a reset signal by an image sensor, such as described herein. In some embodiments, the method 700 can be performed by a processor or controller of an image sensor, such as the processor and/or VSYNC controller described in reference to FIG. 2.

The method 700 includes operation 702 in which a target readout mode is selected, which may specify a new line timing and/or a new scan rate, such as described above. Next, at operation 704, the scan rate of the current line timing of the current frame can be used to modify the line timing of the next frame (see, e.g., FIGS. 6B-6C). Next, at operation 706, the line timing of a reset operation of the next frame is modified based on the modification determined at operation 704. Finally, at operation 708, the line timing of the readout operation of the next frame is modified.

Figure 8:
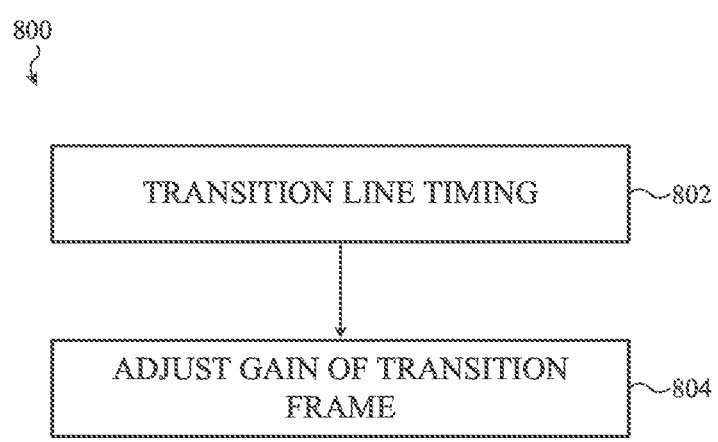
FIG. 8 is a flowchart depicting example operations of a method of correcting gain offset in a frame by an image sensor, such as described herein.

FIG. 8 is a flowchart depicting example operations of a method of correcting gain offset in a frame by an image sensor, such as described herein. As noted above, gain correction may be preferred or required if an image sensor transitions from a low scan rate readout mode to a high scan rate readout mode. The method 800 includes operation 802 in which a line timing is transitioned between frames using one or more methods or techniques such as described herein. Next, at operation 804, a gain adjustment operation can be applied to the frame associated with the transition.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but are instead defined by the claims herein presented.

What is claimed is:

1. A method of operating an image sensor comprising an array of photosites, the method comprising:

reading the array of photosites at a first scan rate during a readout time for a binned mode of operation of the array of photosites; and resetting the array of photosites at a second scan rate for a full-resolution readout mode of the array of photosites;

wherein, the resetting commences during, and after a commencement of, the readout time; and the second scan rate is different than the first scan rate.

2. The method of claim 1, wherein the reading and the resetting are time-synchronized.

3. The method of claim 1, wherein:

the reading is associated with a first frame; and the resetting is associated with a second frame.

4. The method of claim 1, wherein:

the binned mode of operation is associated with a first line time; and the full-resolution mode is associated with a second line time different from the first line time.

5. The method of claim 1, further comprising:

after an integration period following the resetting, reading the array of photosites at the second scan rate and at a second readout time.

6. The method of claim 5, further comprising:

resetting the array of photosites at the first scan rate; wherein, the resetting of the array of photosites at the first scan rate commences during the second readout time.

7. The method of claim 5, further comprising:

resetting the array of photosites at the second scan rate; wherein, the resetting of the array of photosites at the first scan rate commences during the second readout time.

8. An image sensor, comprising:

a photosite array; and a controller configured to, read the photosite array at a first scan rate during a readout time for a binned mode of operation of the photosite array; and reset the photosite array at a second scan rate for a full-resolution readout mode of the photosite array;

wherein, the reset commences during, and after a commencement of, the readout time; and the second scan rate is different than the first scan rate.

9. The image sensor of claim 8, wherein the read and the reset are time-synchronized.

10. The image sensor of claim 8, wherein:

the read is associated with a first frame; and the reset is associated with a second frame.

11. The image sensor of claim 8, wherein:

the binned mode of operation is associated with a first line time; and the full-resolution readout mode is associated with a second line time different from the first line time.

12. The image sensor of claim 8, wherein:

the controller is configured to, read the photosite array at the second scan rate and at a second readout time, after an integration period following the reset.

13. The image sensor of claim 12, wherein:

the controller is configured to, reset the photosite array at the first scan rate; wherein, the reset of the photosite array at the first scan rate commences during the second readout time.

14. The image sensor of claim 12, wherein:

the controller is configured to, reset the photosite array at the second scan rate; wherein, the reset of the photosite array at the first scan rate commences during the second readout time.

15. A method of operating an image sensor comprising an array of photosites, the method comprising:

reading the array of photosites at a first scan rate during a readout time for a full-resolution readout mode of the array of photosites; and resetting the array of photosites at a second scan rate for a binned mode of operation of the array of photosites;

wherein, the resetting commences during, and after a commencement of, the readout time; and the first scan rate is different than the second scan rate.

16. The method of claim 15, wherein:

the reading is associated with a first frame; and the resetting is associated with a second frame.

17. The method of claim 15, wherein:

the full-resolution readout mode is associated with a first line time; and the binned mode of operation is associated with a second line time different from the first line time.

* * * * *